United States Patent
Palomo et al.

(10) Patent No.: US 7,390,376 B2
(45) Date of Patent: Jun. 24, 2008

(54) MEDICAL GOWN WITH FLUID AND MICRO-ORGANISM IMPERVIOUS SEAM

(75) Inventors: Joseph Palomo, Antioch, IL (US); Fernando Amaya, El Paso, TX (US)

(73) Assignee: Allegiance Corporation, McGraw Park, IL (US)

( * ) Notice: Subject to any disclaimer, the term of this patent is extended or adjusted under 35 U.S.C. 154(b) by 388 days.

(21) Appl. No.: 10/464,914

(22) Filed: Jun. 19, 2003

(65) Prior Publication Data

US 2004/0094265 A1 May 20, 2004

Related U.S. Application Data

(60) Provisional application No. 60/426,556, filed on Nov. 15, 2002.

(51) Int. Cl.
*B32B 37/00* (2006.01)

(52) U.S. Cl. ............... 156/308.4; 156/309.6; 2/275; 493/938

(58) Field of Classification Search .............. 2/275; 493/938; 156/308.2, 308.4, 309.6
See application file for complete search history.

(56) References Cited

U.S. PATENT DOCUMENTS

| | | | |
|---|---|---|---|
| 3,486,964 A | 12/1969 | Brunlid | |
| 4,114,200 A | 9/1978 | Smith et al. | |
| 4,635,628 A | 1/1987 | Hubbard et al. | |
| 4,695,334 A | 9/1987 | Mays | |
| 5,444,873 A | 8/1995 | Levin | |
| 5,484,645 A * | 1/1996 | Lickfield et al. | 428/198 |
| 5,766,400 A | 6/1998 | Gallagher et al. | |
| 6,830,543 B2 * | 12/2004 | Alberts et al. | 493/938 |
| 2002/0142692 A1 * | 10/2002 | Ferencz | 442/401 |
| 2003/0124310 A1 * | 7/2003 | Ellis et al. | 428/138 |

* cited by examiner

*Primary Examiner*—John L Goff
(74) *Attorney, Agent, or Firm*—Arent Fox LLP

(57) ABSTRACT

A method of making a fluid impervious seam in a multilaminate fluid impervious medical fabric is disclosed. The multilaminate fluid impervious medical fabric includes at least two layers having different melting points, at least one of the layers is comprised of a fluid impervious material. The method includes overlapping two portions of the multilaminate fluid impervious medical fabric to form an overlapped region wherein the two layers having the innermost position in apposition to one another have a lower melting point relative to the melting point of the fluid impervious material layer. The two portions of multilaminate fluid impervious medical fabric are heat sealed together at the overlap at a temperature which is equal to or greater than the melting point of the innermost identical layers and which temperature is less than the melting point of the fluid impervious material layer. Thus, an integrated fused layer is created from the two layers having the innermost position in apposition to one another, while the fluid impervious material layer remains unmelted. A surgical product made in accordance with this method is disclosed.

44 Claims, 1 Drawing Sheet

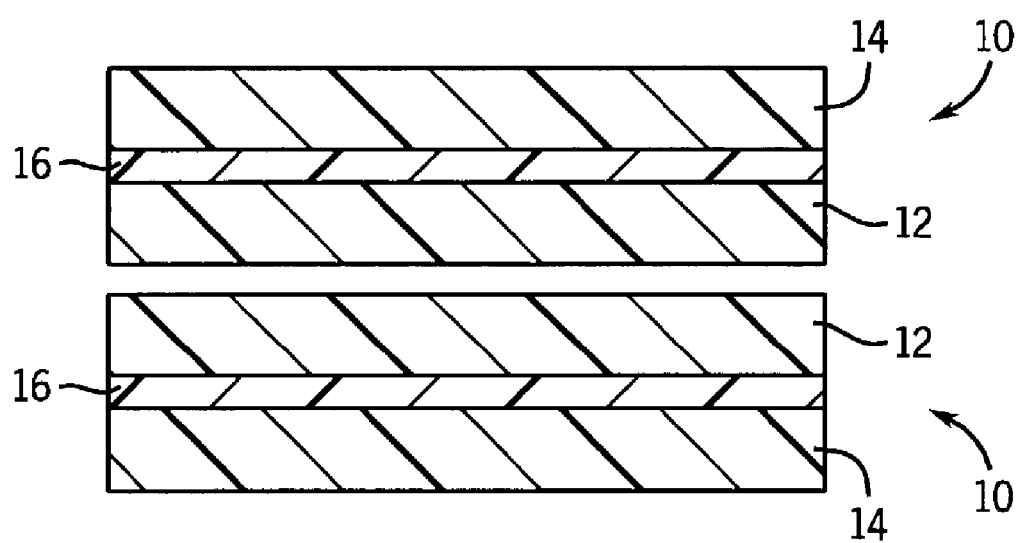

MEDICAL GOWN WITH FLUID AND MICRO-ORGANISM IMPERVIOUS SEAM

FIELD OF INVENTION

The invention relates to a field of medical fabrics. In particular, the invention pertains to a method of making a seam in medical fabrics using heat-sealing techniques.

BACKGROUND OF THE INVENTION

A variety of medical fabrics for use during surgical procedures are known in the art. A multitude of fabric materials in and of themselves have been developed which exhibit desirable properties for their use, such as fluid penetration resistant materials to reduce the likelihood of transporting microbes between patients and health care professionals. Medical fabrics are typically formed or converted into forms that are useful in a surgical setting, such as contamination-resistant drapes or clothing. Contamination resistance of the fabric material per se has been a primary focal point of interest in the field of medical fabrics.

Heat sealing techniques, such as thermal sealing or ultrasonic welding, are known to be useful in the field of medical fabrics to form seals or barriers upon fusing two portions of material to one another. U.S. Pat. No. 5,444,873 to Levin, for example, describes one such application of heat sealing to join the sleeve portion of a surgical gown to the body of the gown by a welded interface at the sealing juncture. Similarly, U.S. Pat. No. 4,635,628 to Hubbard et al. describes a surgical facemask with a moisture barrier utilizing heat seal bonding techniques.

Multilaminate materials which are fluid impervious and useful during surgical procedures also are known. Multilaminate materials that exhibit fluid barrier properties while at the same time affording transport of water vapor through the material also have been developed. Such multilaminate materials can include a breathable flexible thermoplastic film such as ARNITEL™ available from DSM Engineering Co., Sittard, the Netherlands.

Surgical gowns have been used in the medical community to protect health care professionals from liquids and micro-organisms during surgical and other high fluid procedures. Such gowns typically include a single body panel including a front portion, a pair of back portions on the sides of the front portion and extend away from the front portion, and a pair of sleeves which are provided at the juncture of the front and side portion. The front portion covers the front of the health care professional during the procedure. The back portions are secured around and overlap each other to cover the rear of the health care professional and a tying structure. The sleeves cover the arms of the health care professional during the procedure. Because of the proximity of the sleeves and arms of the health care professional to the high fluid procedures, the fluid imperviousness of the sleeves carries a special importance. Likewise, surgical drapes are used to maintain a sterile field in surgery.

Because of the differing properties amongst and between the individual layers from which multi-laminated materials are composed, different layers respond to and are affected by various seam construction techniques in different ways. One method of adjoining two portions of medical fabrics that can be almost universally employed in the field is folding and stitching techniques. While adequate for securing two fabric portions, stitching does not by alone offer fluid impervious properties to the seam with respect to the surrounding environment. Adhesive seals alone or in combination with stitching, such as for example those described in U.S. Pat. No. 4,114,200 to Smith et al., do not necessarily offer consistent penetration-resistant properties to a seam. The barrier of an impervious seam held together by adhesive techniques is dependent upon the thoroughness of applying the adhesive to the surface of the material. General heat sealing techniques typically "weld" all of the layers holistically, or weld only some of the layers in an incomplete manner.

While heat sealing techniques to fuse two overlapping materials are known in the art, these prior attempts utilize materials and heat sealing techniques with properties such that the binding may appear to be fluid impervious, but may not be, as penetration can occur that is not visible or obvious. For example, U.S. Pat. No. 3,486,964 to Brunlid describes sheet material having an overlap seam and method of forming same. Two margins of sheet material are joined by an overlap seam, with one margin overlying the other margin and with its free edge abutting against and sealed to a ridge formed in the sheet material adjacent to the other margin. When the seat material consists of two outer plastic layers (e.g., polyethylene or polypropylene) and an intermediate porous layer such as paper and margins are joined by heat sealing, a continuous plastic surface is formed and the free edge of the intermediate layer is covered with plastic. The reference contains no teaching or suggestion of multi-layered fabrics for medical use, nor does it specifically discuss fluid barrier properties in a medical environment.

Similarly, U.S. Pat. No. 4,695,334 to Mays describes a method of making water impervious materials. A preferred embodiment comprises a three-layer plastic film sandwiched between and fuse bonded to two layers of conjugate fibers having a low melting sheath and a high melting core. The inner layer of the plastic film is relatively high melting while the two outer plies of the film are low melting. The sheaths of the conjugate fibers have been fuse bonded to the plastic film at a temperature below the melt temperature of the cores of the conjugate fibers so that the cores retain their initial fiber-like integrity. The reference is directed to the formation of a unitary laminate material per se from two separate multi-layered sheets, and does not teach or suggest an overlapped seam arrangement formed by such a fusion.

Also, U.S. Pat. No. 5,766,400 to Gallagher, Jr. describes a prefabricated multi-layered flexible product that can be used as a liner for an outer shell or as a stand-alone product. A substrate fabric material is placed in parallel with a synthetic film membrane to form a two ply laminate, and with outer substrate fabric material(s) to form multi-ply laminates. A thermoplastic film is placed in-between the layers to enhance bonding. The laminate(s) and/or separate sheets of above materials are assembled by using a radio frequency welding process and then cut into two or three dimensional forms, which in their bonded state form either a prefabricated component liner or a prefabricated stand alone product. The form may be a glove, sock, shirt, boot/shoe, hat, jacket, pant, etc. The reference does not teach or suggest a sterile barrier-type product suitable for a medical environment.

Thus, difficulty has been encountered in obtaining a product composed of a multi-layer fluid impervious material wherein the seams in the product exhibit the same fluid penetration resistant properties as the material per se but which can also be created using heat sealing techniques. There exists a need for improvements relating to methods for making seams in surgical products made from fluid impervious multi-layered fabrics in which the seam is sealed in a manner which exhibit fluid penetration resistant characteristics similar to the base material.

SUMMARY OF THE INVENTION

The invention provides a method of making a fluid impervious seam with fluid impervious multilaminate medical fabrics in which layer-specific properties are utilized to provide a heat sealed seam having fluid penetration resistance characteristics similar to the base material. In particular, the invention involves the formation of a seal using heat sealing techniques which cooperate with the differing properties and melting point ranges of each layer in the fabric. It has been discovered that differences of layer material properties in certain fluid impervious multi-layer fabrics can be accommodated in a heat sealing process to form a continuous fluid impervious seam without the need for additional sealing techniques, such as stitching or adhesives. The invention utilizes a combination of layer material properties, e.g., melting point ranges of layer material, the overall configuration or arrangement of the layers, the thickness/basis weight of the layers and controlled heat sealing process parameters to form a fluid impervious heat seal having substantially the same fluid impervious properties as the base material. The invention is particularly useful in forming seam attachments of the components of a surgical gown, such as a sleeve seam which often encounter frequent fluid contact during surgical procedures.

A method of making a fluid impervious seam in a multilaminate fluid impervious medical fabric is disclosed. The multilaminate fluid impervious medical fabric includes at least two layers having different melting points, at least one of the layers being comprised of a fluid impervious material. The method includes overlapping two portions of the multilaminate fluid impervious medical fabric to form an overlapped region wherein the two layers having the innermost position in apposition to one another have a lower melting point relative to the melting point of the fluid impervious material layer. The two portions of multilaminate fluid impervious medical fabric are heat sealed together at the overlap at a temperature which is equal to or greater than the melting point of the innermost identical layers and which temperature is less than the melting point of the fluid impervious material layer. Thus, an integrated fused layer is created from the two layers having the innermost position in apposition to one another, while the fluid impervious material layer remains unmelted. A surgical product made in accordance with this method also is disclosed.

BRIEF DESCRIPTION OF THE DRAWINGS

The FIGURE is a cross-sectional side view of an overlapping unsealed portion of a multilaminate material prior to sealing in accordance with one embodiment of the invention.

DETAILED DESCRIPTION OF THE PREFERRED EMBODIMENTS

As used herein, the term "innermost" when describing the layer configuration is meant to refer to the interior layer relative to both exterior surfaces of the fabric when a portion of the fabric is overlapped. The term "fabric" is meant to refer to the collection of all assembled layers of material. The term "material" is meant to refer to the composition used for a specific layer. The term "melting point" when used in the context of a property of a material layer, is meant to encompass not only a specific degree of temperature which induces the material to becomes a liquid, but a temperature range as well. The term "apposition" when used in the context of layer orientation in an overlapping configuration is intended to refer to two non-integrated layers in the closest proximity and directly facing each other at the innermost position within the overlapped assembly.

Multilaminate fluid impervious fabrics which can be used in accordance with the invention include flexible, medical grade fabrics having at least two layers each composed of materials having different melting points of which at least one of the layers is composed of a flexible thermoplastic fluid impervious material. Suitable multilaminate fabrics include those adapted for use in surgical procedures to restrict the transport of microbes between patient and practitioner and which meet standard fluid impervious acceptance criteria. In accordance with the invention, however, the layer materials must contain melting point differences relative to one another in a manner that accomplishes the fluid penetration resistance upon heat sealing, as described below.

The fluid impervious layer material can be any material that prevents or inhibits transport of liquid across the material. Fluid impervious materials that can be used include flexible thermoplastic monolithic or microporous films. Suitable materials for the film layer include, but are not limited to, elastomeric co-polyesters, polyurethanes and nylon-based polymers. Suitable elastomeric co-polyesters which can be used include, but are not limited to, polyether-ester block co-polymers, such as ARNITEL™ available from DSM Engineering Co., Sittard, the Netherlands. Another example of a suitable elastomeric co-polyester which can be used is HYTREL™ available from DuPont de Nemours Co., Wilmington, Del.

According to the invention, at least one layer of the fabric comprises a fluid impervious film layer so that the entire multi-layered fabric per se is one which is fluid impervious. When the multilaminate fabric is overlapped, the fluid impervious material layer can be positioned immediately adjacent to innermost layers composed of a different, lower melting point material.

Aside from a fluid impervious thermoplastic film layer, the remaining layer(s) can be composed of any material suitable for use in medical fabric provided the melting point of such material can be utilized in accordance with the heat sealing process of the invention, that is, the melting point values of the materials coordinate with the heat sealing temperature to produce the fluid impervious seal. Suitable materials for use in those layers of the medical fabric include, but are not limited to non-woven materials such as a spun melt or carded polyolefin, and carded, spun-laced or spun-melt polyester. Suitable spun melt polyolefins include but are not limited to spun melt polyethylene, polypropylene and co-polymers thereof. Examples of spun melt polypropylene include those available from BBA Nonwovens, Simponsville, S.C. and First Quality Nonwovens, Hazelton, Pa.

The fluid impervious seam formed using two portions of the same multi-layered fluid impervious fabric exhibits fluid impervious parameters from two aspects. In one aspect, by virtue of having a fluid impervious material in at least one of the layers, the fabric itself provides resistance to fluid transport across the entire fabric. In traditional procedures in the prior art, adjoining two portions of such a multi-layered fluid impervious fabric did not prevent or inhibit the transport of fluid between the layers at the overlapping region. The invention provides a fluid impervious barrier located at the adjoined region of two portions of a multi-layer fluid impervious fabric so as to afford fluid impervious properties to the seam wherein fluid penetration resistance is accomplished with respect to the fabric per se and the adjoining region of the fabric at the seam. Additionally, since the same material is used as the lower melting point material, at least the innermost fused single layer produced in accordance with the principles of the invention possesses chemical uniformity at the seal.

There are 2 primary components to creating the fluid and micro-organism impervious heat sealed seam, the fabric construction and the sealing process. In a preferred embodiment, the composite fabric structure is 3 layers (nonwoven fabric/film/nonwoven fabric) to achieve imperviousness. One of the layers is a film, monolithic or microporous, which is what makes the composite impervious. The other layer(s) are nonwoven fabrics such as spun-melt polypropylene.

A key to the composite fabric structure is using nonwoven fabrics that have a melting temperature that is lower than the melting temperature of the film. Thus, the melting point temperature parameters of each layer of the fabric must be determined and accommodated in combination with the parameters of the heat sealing technique to be employed. In a preferred embodiment, the melting temperature of the nonwoven fabrics is approximately 40 C lower than the melting temperature of the film. When applying the heat from the sealing process it is important to only melt the nonwoven fabrics that are in contact with each other to obtain the impervious seal. The other nonwoven layer may also melt but the film must not melt. If the film melts and flows, defects or leaks in the seal will occur. The impervious seal is made by melting the layers of nonwoven fabric.

In order for fluid penetration resistance to be present in a given portion of product made in accordance with the invention, a continuous seal along the entire length of seam is preferred. The dimensions of the seal formed by the method of the invention can vary in accordance with the dimensions of the heat-sealing apparatus. Typically, the width of the seal to create the seam can range from about ¼ in to about ⅜ in.

A variety of heat sealing techniques can be used in accordance with the invention provided the applied temperature and pressure can be controlled or pre-selected. The optimal heat seal is obtained from an impulse sealer that heats up and cools down for each seal made. Other suitable thermal heat sealing techniques that can be employed include, but not limited to, ultrasonic welding techniques. Alternatively, it is feasible that a constant temperature sealing bar may be used. Important parameters for obtaining consistent sealing using certain techniques include the temperature and pressure on the material during the sealing step. The process parameters such as temperature and pressure can vary according to the particular material configuration and layer compositions of the fabric. The parameters must be refined on each piece of equipment as they vary. The same applies to variations in materials. Process refinement is based on statistical methods to prepare samples at the different temperatures and pressures. Then the samples are tested for seal strength and hydrostatic pressure.

Referring to the FIGURE, two portions of a multi-layered fabric 10 are overlapped such that a layer having a lower melting point 12 with respect to the impervious film layer 16 is oriented in apposition to one another so that the overlapped layers 12 will contact each other directly during the sealing process. A third layer 14 can be the same material as the overlapped layer 12 or can be a different material, provided that the melting point of the third layer 14 is at least about the same as or higher than the melting point of the overlapping layer 12. In the overlapped region, at least one of the third layer 14 will come into direct contact with the heat source used during the heat sealing step. If the third layer 14 is a different material, carded or spun-laced wood pulp polyester can be used as a suitable material in addition to those materials suitable for the overlapping layer 12.

The FIGURE illustrates the method according to one embodiment of the invention as applied to overlapping portions of multi-layered fabric. Upon application of a heat source (not shown) to the overlapped multi-layered fabric 10, the sealing temperature is selected in a predetermined manner so as to be greater than innermost layers 12 but less than the inner film 16. Subsequent to heat sealing step, lower melting point material layer 12 has been "selectively welded" such that a single integrated fused layer results, while the inner film layer 16 having a higher melting point remains unmelted (although some softening may occur).

The method of the invention can be incorporated into conventional manufacturing systems readily available in the art. The invention can be included within the seam-forming steps of manufacturing techniques currently used for the production of surgical fabric products, such as those for the production of surgical gowns, and any other surgical products which can benefit from the formation of a fluid impervious seam as part of their construction into final product form, such as for example surgical drapes.

EXAMPLE—1

A breathable, fluid impervious multilaminate material compressed of a non-woven spun-bond polypropylene layer, an intermediate breathable flexible thermoplastic film layer composed of a material identified as ARNITEL™ available from DSM Engineering Co., Sittard, the Netherlands, and a non-woven spun-bond polypropylene layer was used to make a seam in accordance with the method of the invention. In this construction, a film having a 0.5 mil thickness (0.0005") was used. The melting point values and basis weight (in grams per square meter)(GSM) of each layer of the material are summarized in the following table:

| Layer | Material | GSM | Melting Point Temp. (° C.) |
|---|---|---|---|
| Layer 1 | SBPP | 25 | 165 |
| Layer 2 | ARNITEL ™ film | 15 | 215 |
| Layer 3 | SBPP | 30 | 165 |

An overlapping region between two portions of the material was created so as to orient two spun-bond polypropylene layers to be welded and integrated towards each other. The overlapping region was subjected to heat sealing using an impulse sealer available from Therm-O-Seal, Mansfield, Tex., with sealing bar at a temperature of about 180° C. at a pressure gauge setting set to about 70 psi until the spun-bond polypropylene layers were fused and integrated into a single layer. The resulting seam contained a total of five distinguishable layers, with the innermost layer now being a single layer of polypropylene.

The fluid impervious properties of the seam were tested in accordance with standard methods. Initially, samples were screened using seal strength and barrier testing method ASTM D2724 "Standard Test Method for Bonded, Fused and Laminated Apparel Fabrics" and IST 80.6 "Standard Test Method for Water Resistance using the Hydrostatic Pressure Test". The optimal seals are obtained when a minimum seal strength of 4 lb/in is obtained and hydrostatic pressures are greater than 120 cm of water. Samples which achieved these standards were then subjected to ASTM F1670 "Standard Test Method for Resistance of Materials used as Protective Clothing to Penetration by Synthetic Blood" and ASTM F1671 "Standard Test Method for Resistance of Materials and in Protective Clothing to Penetration by Blood Borne Pathogens using PHI-X174 Bacteriophage Penetration as a Test System." ASTM F1670 is a precursor to ASTM F1671. If a sample passes ASTM F1670, a visual penetration test, then it is tested using ASTM F1671 which is a biological assay to detect penetration that is not visible or obvious. This testing is performed using a statistical sampling plan. If the seam passes the statistical criteria then it is considered impervious. The seal thus made according to this embodiment of the invention satisfied the acceptance criteria for fluid impervious material. The base fabric must also pass these tests for the seam to pass.

Heat sealed seams may appear to be fluid and micro-organism impervious but may not be, as penetration can occur that is not visible or obvious. That is why both tests are used. A seam may pass ASTM F1670 but fail F1671 demonstrating that visual fluid imperviousness is not the same as microorganism impervious.

EXAMPLE—2

A breathable, fluid impervious multilaminate material composed of a non-woven spun-bond polypropylene layer, an intermediate breathable flexible thermoplastic film layer composed of a material identified as HYTREL™ available from DuPont de Nemours Co., Wilmington, Del., and a non-woven spun-bond polypropylene layer was used to attempt to make a seam in accordance with the method of the invention. In this construction, a film having a 1.0 mil thickness (0.001") was used. The melting point values and basis weight (in grams per square meter)(GSM) of each layer of the material are summarized in the following table:

| Layer | Material | GSM | Melting Point Temp. (° C.) |
|---|---|---|---|
| Layer 1 | SBPP | 25 | 165 |
| Layer 2 | HYTREL ™ film | 30 | 207 |
| Layer 3 | SBPP | 30 | 165 |

Where SBPP is an overlapping region between two portions of the material was created so as to orient two spun-bond polypropylene layers to be welded and integrated towards each other. The overlapping region was subjected to heat sealing using a Therm-O-Seal™ impulse sealer with sealing bar at a temperature of about 200° C. at a pressure gauge setting set to about 70 psi until the spun-bond polypropylene layers were fused and integrated into a single layer.

In this example, the seal failed. The reason is that not enough heat went through the structure to effectively melt the opposing spun-bond polypropylene layers due to the thicker film. Increasing the heat enough to melt the inner layer burnt the outer layer.

Thus, it is seen that a number of variables affect the heat transfer through the fabric, including material thickness/basis weight, melting point, temperature and pressure of the sealer. It is by selecting, testing and processing the multi-laminated fluid impervious medical fabrics in accordance with the present invention that a fluid and microorganism impervious seam can be effectuated.

INDUSTRIAL APPLICABILITY

The invention is useful in the manufacture of products that are composed of multi-laminated fluid impervious medical fabrics wherein fluid penetration resistance properties along conjoined portions of the fabric are beneficial for its use. The invention is particularly useful in the manufacture of fluid impervious surgical gowns which typically encounter high fluid amount as part of a surgical procedure. An improved barrier against fluid penetration is afforded to the user of such products.

The invention has been described with reference to various specific and preferred embodiments and techniques. It will be understood that reasonable alterations, variations and modifications may be made to such embodiment and techniques while remaining within the spirit and scope of the invention. Accordingly, it is intended to include all such alternatives, modifications and variations set forth within the spirit and scope of the appended claims.

What is claimed is:

1. A method of making a fluid impervious seam in a multilaminate fluid impervious medical fabric comprising at least two layers having different melting points, at least one of the layers is comprised of a fluid impervious material, the method comprising: overlapping two portions of such multilaminate fluid impervious medical fabric to form an overlapped region wherein the two layers having the innermost position in apposition to one another have a lower melting point relative to the melting point of the fluid impervious material layer; heat sealing the two portions of multilaminate fluid impervious medical fabric together at the overlap at a temperature which is equal to or greater than the melting point of the innermost identical layers and which temperature is less than the melting point of the fluid impervious material layer; whereby an integrated fused layer is created from the two layers having the innermost position in apposition to one another, while the fluid impervious material layer remains unmelted.

2. The method of making a fluid impervious seam in a multilaminate fluid impervious medical fabric of claim 1 further including the step of forming the medical fabric into a surgical drape.

3. The method of making a fluid impervious seam in a multilaminate fluid impervious medical fabric of claim 1 further including the step of forming the medical fabric into a gown.

4. The method of making a fluid impervious seam in a multilaminate fluid impervious medical fabric of claim 1 further including the step of forming the seam in a sleeve construction of a surgical gown.

5. The method of making a fluid impervious seam in a multilaminate fluid impervious medical fabric of claim 1 further including the step of utilizing as the fluid impervious material a flexible thermoplastic monolithic film.

6. The method of making a fluid impervious seam in a multilaminate fluid impervious medical fabric of claim 1 further including utilizing as the fluid impervious material a flexible thermoplastic microporous film.

7. The method of making a fluid impervious seam in a multilaminate fluid impervious medical fabric of claim 1 further including utilizing as the fluid impervious material a material selected from a group comprising elastomeric co-polyesters, polyurethanes and nylon-based polymers.

8. The method of making a fluid impervious seam in a multilaminate fluid impervious medical fabric of claim 1 further including utilizing as the fluid impervious material a polyether-ester block co-polymer.

9. The method of making a fluid impervious seam in a multilaminate fluid impervious medical fabric of claim 1 further including utilizing as the layer that is not made of the fluid impervious material, a non-woven material.

10. The method of making a fluid impervious seam in a multilaminate fluid impervious medical fabric of claim 1 further including utilizing as the layer that is not made of the fluid impervious material, a material selected from the group comprising a spun-melt polyolefin, and carded or spun-laced polyester.

11. The method of making a fluid impervious seam in a multilaminate fluid impervious medical fabric of claim 1 further including utilizing as the layer that is not made of the fluid impervious material, a material selected from the group comprising spun-melt polyethylene, polypropylene and co-polymers thereof.

12. The method of making a fluid impervious seam in a multilaminate fluid impervious medical fabric of claim 1 further including providing a third layer sandwiching the fluid impervious material together with the layer that is not made of the fluid impervious material.

13. The method of making a fluid impervious seam in a multilaminate fluid impervious medical fabric of claim 12 further including providing as the third layer a material selected from the group comprising a spun-melt polyolefin, carded or spun-laced polyester, and carded or spun-laced wood pulp polyester.

14. The method of making a fluid impervious seam in a multilaminate fluid impervious medical fabric of claim 12 further including providing as the third layer a material selected from the group comprising spun-melt polyethylene, polypropylene and co-polymers thereof.

15. The method of making a fluid impervious seam in a multilaminate fluid impervious medical fabric of claim 12 further providing the third layer as the same material as the overlapped layer.

16. The method of making a fluid impervious seam in a multilaminate fluid impervious medical fabric of claim 12 further providing the third layer as a different material than the overlapped layer.

17. The method of making a fluid impervious seam in a multilaminate fluid impervious medical fabric of claim 16 further providing the melting point of the third layer at least about the same as or higher than the melting point of the overlapping layer.

18. The method of making a fluid impervious seam in a multilaminate fluid impervious medical fabric of claim 16 further providing the melting point of the third layer lower than the melting point of the fluid impervious material layer.

19. The method of making a fluid impervious seam in a multilaminate fluid impervious medical fabric of claim 1 further wherein when the multilaminate fabric is overlapped, positioning the fluid impervious material layer immediately adjacent to the overlapping layers having a lower melting point material.

20. The method of making a fluid impervious seam in a multilaminate fluid impervious medical fabric of claim 1 further including providing at least one of the layers having a melting temperature approximately 40 C lower than the melting temperature of the fluid impervious material.

21. The method of making a fluid impervious seam in a multilaminate fluid impervious medical fabric of claim 1 further including obtaining the heat seal from an impulse sealer that heats up and cools down for each seal made.

22. A method of making a fluid impervious seam in a multilaminate fluid impervious medical fabric comprising at least two layers having different melting points, at least one of the layers is comprised of a fluid impervious material, the method comprising: selecting such multilaminate medical fabric such that when an overlapped region is formed the two layers having the innermost position in apposition to one another have a lower melting point relative to the melting point of the layer comprised of a fluid impervious material; coordinating the melting points of the materials with the heat sealing temperature such that heat sealing the two portions of multilaminate medical fabric together at the overlap occurs at a temperature which is equal to or greater than the melting point of the innermost layers and which temperature is less than the melting point of the layer comprised of a fluid impervious material; wherein fluid penetration resistance is accomplished with respect to the fabric per se and the adjoining region of the fabric at the seam.

23. The method of making a fluid impervious seam in a multilaminate fluid impervious medical fabric of claim 22 further including coordinating the pressure on the material during the sealing step such that the two portions of multilaminate medical fabric are sealed together at the overlap while the layer comprised of a fluid impervious material remains unmelted.

24. The method of making a fluid impervious seam in a multilaminate fluid impervious medical fabric of claim 22 further including coordinating the thickness and basis weight of the fluid impervious material such that the two portions of multilaminate medical fabric are sealed together at the overlap while the layer comprised of a fluid impervious material remains unmelted.

25. The method of making a fluid impervious seam in a multilaminate fluid impervious medical fabric of claim 22 further including the step of forming the medical fabric into a surgical drape.

26. The method of making a fluid impervious seam in a multilaminate fluid impervious medical fabric of claim 22 further including the step of forming the medical fabric into a gown.

27. The method of making a fluid impervious seam in a multilaminate fluid impervious medical fabric of claim 22 further including the step of forming the seam in a sleeve construction of a surgical gown.

28. The method of making a fluid impervious seam in a multilaminate fluid impervious medical fabric of claim 22 further including the step of utilizing as the fluid impervious material a flexible thermoplastic monolithic film.

29. The method of making a fluid impervious seam in a multilaminate fluid impervious medical fabric of claim 22 further including utilizing as the fluid impervious material a flexible thermoplastic microporous film.

30. The method of making a fluid impervious seam in a multilaminate fluid impervious medical fabric of claim 22 further including utilizing as the fluid impervious material a material selected from a group comprising elastomeric co-polyesters, polyurethanes and nylon-based polymers.

31. The method of making a fluid impervious seam in a multilaminate fluid impervious medical fabric of claim 22 further including utilizing as the fluid impervious material a polyether-ester block co-polymer.

32. The method of making a fluid impervious seam in a multilaminate fluid impervious medical fabric of claim 22 further including utilizing as the layer that is not made of the fluid impervious material, a non-woven material.

33. The method of making a fluid impervious seam in a multilaminate fluid impervious medical fabric of claim 22 further including utilizing as the layer that is not made of the fluid impervious material, a material selected from the group comprising a spun-melt polyolefin, and carded or spun-laced polyester.

34. The method of making a fluid impervious seam in a multilaminate fluid impervious medical fabric of claim 22 further including utilizing as the layer that is not made of the fluid impervious material, a material selected from the group comprising spun-melt polyethylene, polypropylene and co-polymers thereof.

35. The method of making a fluid impervious seam in a multilaminate fluid impervious medical fabric of claim 22 further including providing a third layer that, together with the layer that is not made of the fluid impervious material, sandwiches the fluid impervious material.

36. The method of making a fluid impervious seam in a multilaminate fluid impervious medical fabric of claim 35 further including providing as the third layer a material selected from the group comprising a spun-melt polyolefin, carded or spun-laced polyester, and carded or spun-laced wood pulp polyester.

37. The method of making a fluid impervious seam in a muhilaminate fluid impervious medical fabric of claim 35 further including providing as the third layer a material selected from the group comprising spun-melt polyethylene, polypropylene and co-polymers thereof.

38. The method of making a fluid impervious seam in a multilaminate fluid impervious medical fabric of claim 35 further providing the third layer as the same material as the overlapped layer.

39. The method of making a fluid impervious seam in a multilaminate fluid impervious medical fabric of claim 35 further providing the third layer as a different material than the overlapped layer.

40. The method of making a fluid impervious seam in a multilaminate fluid impervious medical fabric of claim 39 further providing the melting point of the third layer at least about the same as or higher than the melting point of the overlapping layer.

41. The method of making a fluid impervious seam in a multilaminate fluid impervious medical fabric of claim 39 further providing the melting point of the third layer lower than the melting point of the fluid impervious material layer.

42. The method of making a fluid impervious seam in a multilaminate fluid impervious medical fabric of claim 22 further wherein when the multilaminate fabric is overlapped, positioning the fluid impervious material layer immediately adjacent to the overlapping layers having a lower melting point material.

43. The method of making a fluid impervious seam in a multilaminate fluid impervious medical fabric of claim 22 further including providing at least one of the layers having a melting temperature approximately 40 C lower than the melting temperature of the fluid impervious material.

44. The method of making a fluid impervious seam in a multilaminate fluid impervious medical fabric of claim 22 further including obtaining the heat seal from an impulse sealer that heats up and cools down for each seal made.

* * * * *